(No Model.) 3 Sheets—Sheet 1.
T. C. MARSHALL.
GRAIN BINDING HARVESTER.

No. 332,725. Patented Dec. 22, 1885.

WITNESSES
INVENTOR (No Model.) 3 Sheets—Sheet 3.

T. C. MARSHALL.
GRAIN BINDING HARVESTER.

No. 332,725. Patented Dec. 22, 1885.

WITNESSES

INVENTOR
Thos. C. Marshall
by A. M. Smith
Attorney

UNITED STATES PATENT OFFICE.

THOMAS C. MARSHALL, OF AKRON, OHIO, ASSIGNOR TO LEWIS MILLER, OF SAME PLACE.

GRAIN-BINDING HARVESTER.

SPECIFICATION forming part of Letters Patent No. 332,725, dated December 22, 1885.

Application filed April 7, 1884. Serial No. 126,946. (No model.)

*To all whom it may concern:*

Be it known that I, THOMAS C. MARSHALL, of Akron, county of Summit, and State of Ohio, have invented a new and useful Improvement in Grain-Binding Harvesters, of which the following is a full, clear, and exact description, reference being had to the accompanying drawings, making part of this specification.
My invention relates to an improvement in that class of grain-binding harvesters in which the grain is bound upon an inclined elevating-table, located between the grain-platform and the path of the drive-wheel during the process of elevating the grain, and in which, also, the needle is driven by a shaft located below the moving grain, and the knotter is driven by a shaft located on the opposite side from that of the needle-shaft, so that the grain passes through a confined space between the hub of the needle and the knotting mechanism.

My invention consists in the combination, with the binder-table, of a breast-plate or shield suspended above the same and pivoted upon the knotter-actuating shaft, whereby it is adapted to be rocked upon its pivotal connection with said shaft for a purpose hereinafter specifically set forth.
My invention consists, also, in providing a suitable mechanism for automatically actuating said breast-plate from the knotter-actuating shaft.

My invention consists, further, in certain details of arrangement and construction of parts, hereinafter described and specifically pointed out.

Figure 1:
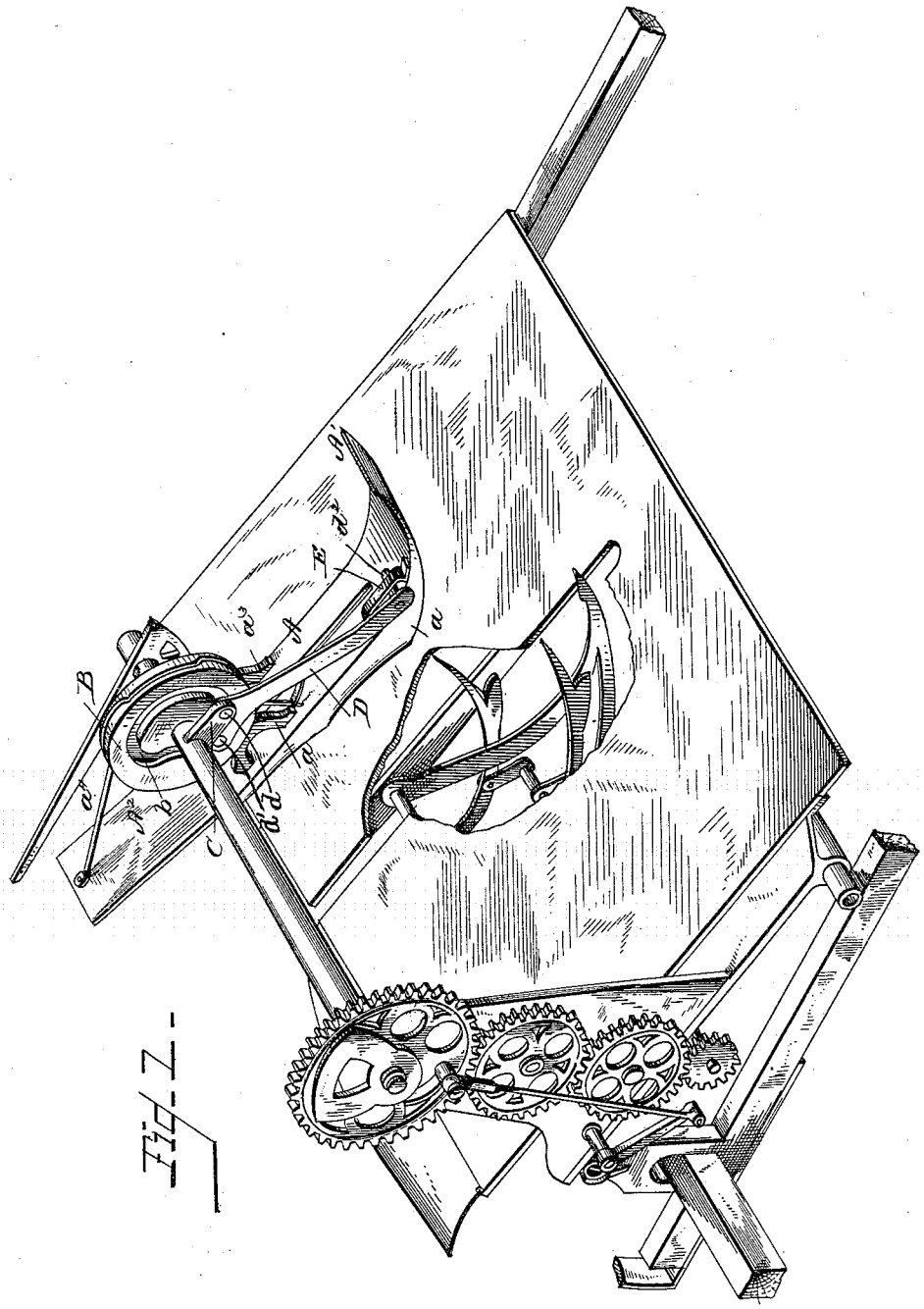
Figure 2:
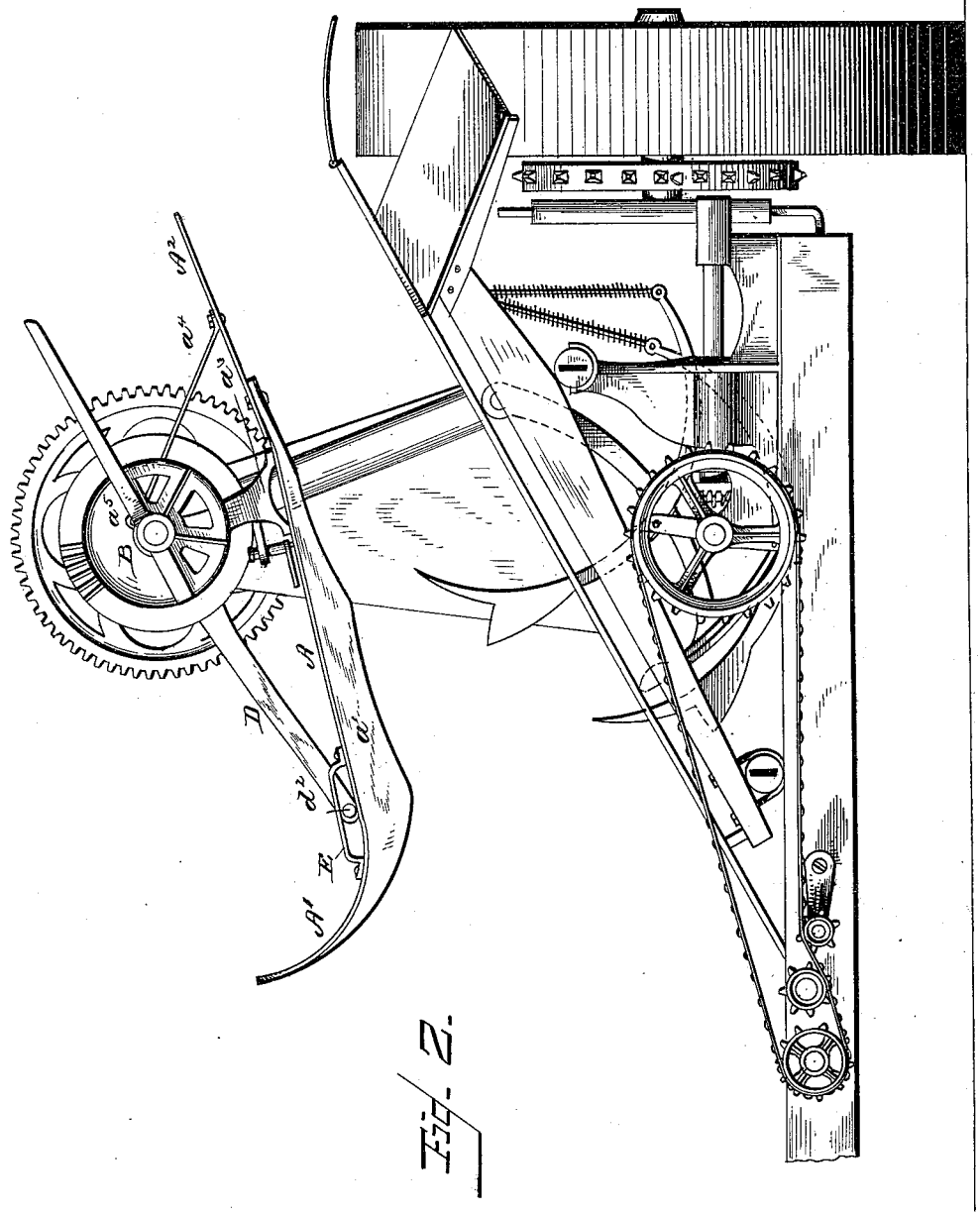
Figure 3:
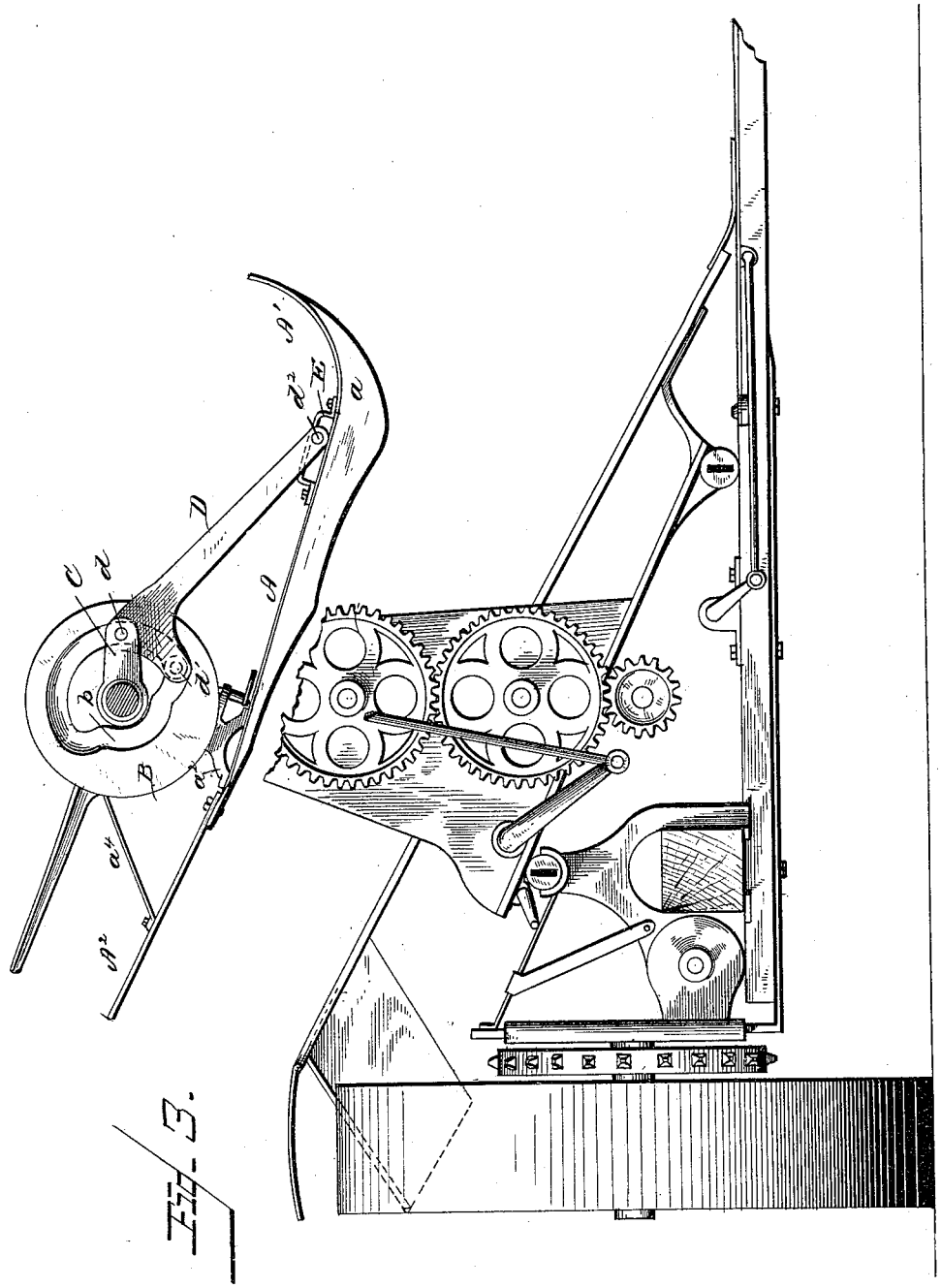

In the accompanying drawings, Figure 1 represents a perspective view of my improvements applied to a grain-binding harvester, and showing the location of the breast-plate, the knotter-actuating shaft, upon which the shield is pivoted, and the mechanism for rocking the said breast-plate or shield upon its pivot. Fig. 2 is a rear elevation of the same, illustrating the manner of hinging the breast-plate upon the knotter-actuating shaft, and the relation of the packers and the needle-arm to said shield or breast-plate, which act, in connection with the latter, to pack and bind the grain during the movement of the inclined table, and Fig. 3 represents a front elevation of the machine, showing the binder-actuating mechanism, the gear-standard for supporting the knotter-shaft, and mechanism located upon said shaft and its sleeve for operating the breast-plate, the gear-standard being broken away to better show the mechanism for rocking the breast-plate upon its pivot.
The general organization of the machine, arrangement of parts, &c., is similar to that described and shown in Letters Patent No. 276,448, granted April 24, 1883, to Lewis Miller, and it will not, therefore, be necessary to describe the same herein, further than is necessary to an understanding of my invention.

A represents the knotter-shield or breast-plate of a grain-binding harvester, located above the binder-table, which is inclined the same as in the patent above referred to, and is located between the platform-carrier upon which the grain falls as it is cut and the top of the drive-wheel. The breast-plate A is constructed of mealleable iron, sheet metal, or other suitable material for rendering the same as light as possible, and at the same time securing the requisite amount of strength. It is composed, in main, of a flat surface, (indicated at A,) which at its forward end, or that end adjacent to the platform-carrier, is curved upwardly, as shown at A', for guiding the moving grain beneath the plate A, where it is afterward bound. Said breast-plate is also provided at its opposite end with a tail-piece, $A^2$, of a width corresponding to that of plate A, and arranged to operate in the manner and for the purpose hereinafter described. Secured beneath the plate A A' are two cheek plates or flanges, $a$ $a'$, of the form shown, or of such form as will adapt them to prevent the backward movement of the grain when the breast-plate is vibrated downward.

The manner of supporting the breast-plate or knotter-shield is as follows: Brackets $a^2$ $a^3$ are secured to the upper face of the breast-plate A, which extend upward to the knotter-actuating shaft and terminate in a sleeve, embracing the same, thereby serving to suspend the knotter-shield from said shaft, at the same time adapting it to be rocked upon the knotter-actuating shaft as a pivot or center. The brackets $a^2$ $a^3$ are located near the edges of the breast-plate, so as to allow sufficient space between them for the free working of the knotter and its accompanying mechanism. Another support, in the form of a rod, $a^4$, extends from the outer end of the tail-piece $A^2$ of the breast-plate up to the bracket-sleeve, and is secured to the latter by means of a lug, $a^5$, cast upon or otherwise secured thereto. This rod serves to uphold the tail-piece $A^2$, and to brace and relieve the same of strain that may be put upon it.

Mounted upon and rotating with the knotter-actuating shaft is a cam-wheel, B, located, as in the case hereinbefore referred to, nearly in the same vertical plane with the binder-needle. Said wheel, as before stated, is mounted upon and keyed or otherwise secured to the knotter-actuating shaft. It therefore rotates with said shaft, which is described in the patent cited above as an intermittently-rotating shaft, rotating only when the binder mechanism is thrown into operation by the action of the grain upon the binder-gear trip. It will be apparent, then, that the wheel B does not rotate continually, but has an intermittent motion imparted to it through the action of the knotter-actuating shaft. Said wheel is provided on its forward side or face with a cam-groove, $b$, formed therein, as shown in Figs. 1 and 3 of the drawings. Cast upon or otherwise secured to the knotter-actuating shaft-sleeve is a lug or ear, C, to which is pivoted an elbow-lever, D, by means of a spur or pivot, $d$, projecting from the elbow or angle thereof, and working in a bearing in the lug C. The shorter arm of this elbow-lever is provided with a roller, $d'$, at its end, which projects laterally therefrom and enters and is engaged by the cam-groove $b$ of wheel B. The long arm of lever C is provided with a spur or pin, $d^2$, extending rearwardly under a loop, E, attached to the upper face of the breast-plate. This loop E is made of sufficient length to accommodate the endwise play of pin $d^2$ when the lever C acts to raise or lower the outer end of the breast-plate. As before stated, the roller $d'$ enters the cam-groove $b$; hence it is actuated thereby and follows the groove when the wheel B is revolved. The groove $b$ is so constructed or arranged that the roller $d'$ will at regular intervals be elevated and lowered, and as such roller is attached to the shorter arm of lever C, it will be seen that as the roller $d'$ is moved by the action of the cam-groove, so will the lever C be vibrated upon its pivot $d$, and thus the long arm of the lever will operate, through its connection with the outer end of the knotter-shield, to raise or lower the same, according to the direction in which the roller $d'$ is actuated.

The raising and lowering of the knotter-shield described is timed to agree with the action of the needle-arm and ejector, for a purpose that will be readily understood. During the process of binding the grain on the inclined table, and while the needle is raised for that purpose, it is desirable to have the knotter-shield elevated for the purpose of providing room for the grain accumulating at the foot of the inclined table, behind the needle. Therefore the said knotter-shield or breast-plate is adapted, by the arrangement of the cam-groove $b$, to be elevated during the operation of binding the grain into a bundle. At the moment that the bundle is complete, the knot tied, and the needle withdrawn the cam-groove $b$ allows the long arm of lever C to descend, depressing the outer end of the breast-plate. The descent of the outer end of the breast-plate, or that end adjacent to the platform-carrier, causes the opposite end to rise and increase the space between the binder-table and tail-piece $A^2$ of the breast-plate, whereby the discharge of the bound bundle is greatly facilitated. In this position the breast-plate serves also to hold the accumulating grain down to the action of the compressing devices until the needle is again raised for carrying the cord to the knotting devices.

Having now described my invention, what I claim as new is—

1. In a grain-binding harvester, a knotter-shield or breast-plate suspended above the binder-table and pivoted upon the knotter-actuating shaft, in combination with means operating in connection with the knotter-actuating shaft for vibrating the breast-plate, in the manner and substantially as specified.

2. In a grain-binding harvester, an inclined elevating binder-table located between the platform-carrier and the driving-wheel, in combination with a pivoted automatically-vibrated breast-plate suspended above said inclined table, and the needle-arm and packers operating in connection therewith, for the purpose and substantially as described.

3. In a grain-binding harvester, a breast-plate suspended above the binder-table and pivoted upon the knotter-actuating shaft, in combination with a cam-wheel mounted upon and rotating with the knotter-actuating shaft, and a link or rod interposed between the inner end of the breast-plate and the cam-wheel, and actuated by the latter for elevating said inner end of the breast-plate, substantially as and for the purpose described.

4. In a grain-binding harvester, a breast-plate suspended above the binder-table and pivoted upon the knotter-actuating shaft, in combination with an intermittently-rotating knotter-actuating shaft, and link interposed between the outer end of the breast-plate and the cam-wheel secured upon and rotating with the knotter-actuating shaft, whereby the said breast-plate is adapted to be rocked during the process of binding or at suitable intervals, substantially as described.

5. In a grain-binding harvester, the combination, with the binder-table thereof, of the swinging pivoted knotter-shield or breast-plate constructed of metal or other suitable material, and provided with the curved ribs or plates upon its under side, for the purpose and substantially as described.

6. In a grain-binding harvester, the knotter-shield or breast-plate suspended above the inclined binder-table and pivoted upon the knotter-actuating shaft, in combination with an elbow-lever connected at one end with the inner end of the breast-plate by means of a sliding loop-bearing, and at its other end provided with a pin or stud shaft projecting within and engaged by a cam-groove formed in a wheel secured to the knotter-actuating shaft, said lever at its elbow being pivoted to a lug formed upon the knotter-actuating shaft-sleeve, all for joint operation, substantially as described.

7. In a grain-binding harvester, the knotter-shield or breast-plate constructed of sheet metal or other suitable material, in combination with a supplementary plate secured to the rear end thereof, the loop-bearing formed upon or secured to the inner or front end of said breast-plate, the standard through which the breast-plate is pivoted upon the knotter-actuating shaft and held suspended above the binder-table, and the braces, all of said parts being constructed and arranged relatively to each other, for the purpose and substantially as described.

In testimony whereof I have hereunto set my hand this 22d day of February, A. D. 1884.

THOMAS C. MARSHALL.

Witnesses:
   O. L. SADLER,
   LEWIS MILLER.